US007954759B2

(12) United States Patent
Marin Martinod

(10) Patent No.: US 7,954,759 B2
(45) Date of Patent: Jun. 7, 2011

(54) CONTROL SYSTEM FOR THE NACELLE OF A TURBOREACTOR

(75) Inventor: Thierry Marin Martinod, Nesles la Vallee (FR)

(73) Assignee: Aircelle, Gonfreville l'orcher (FR)

( * ) Notice: Subject to any disclaimer, the term of this patent is extended or adjusted under 35 U.S.C. 154(b) by 836 days.

(21) Appl. No.: 11/919,353

(22) PCT Filed: Jun. 12, 2006

(86) PCT No.: PCT/FR2006/001315
§ 371 (c)(1),
(2), (4) Date: Oct. 26, 2007

(87) PCT Pub. No.: WO2006/134253
PCT Pub. Date: Dec. 21, 2006

(65) Prior Publication Data
US 2009/0065634 A1 Mar. 12, 2009

(30) Foreign Application Priority Data
Jun. 16, 2005 (FR) .................................. 05 06094

(51) Int. Cl.
*F02K 1/54* (2006.01)

(52) U.S. Cl. .................................. 244/110 B; 60/226.2

(58) Field of Classification Search ............... 244/110 B; 60/226.2, 204
See application file for complete search history.

(56) References Cited

U.S. PATENT DOCUMENTS

| 5,372,338 | A | 12/1994 | Carlin et al. |
| 5,960,626 | A | 10/1999 | Baudu et al. |
| 6,094,908 | A | 8/2000 | Baudu et al. |
| 7,370,468 | B2 * | 5/2008 | Colotte et al. .............. 60/226.2 |
| 7,562,520 | B2 * | 7/2009 | Dehu et al. ...................... 60/204 |
| 2002/0157376 | A1 | 10/2002 | Ahrendt |
| 2003/0019206 | A1 | 1/2003 | Johnson |
| 2003/0101712 | A1 * | 6/2003 | Johnson et al. .............. 60/226.2 |
| 2003/0159429 | A1 | 8/2003 | Langston et al. |
| 2003/0192987 | A1 | 10/2003 | Ahrendt et al. |
| 2004/0139725 | A1 | 7/2004 | Colotte et al. |
| 2006/0042229 | A1 * | 3/2006 | Hanlon et al. .............. 60/226.2 |
| 2010/0168982 | A1 * | 7/2010 | Maalioune ..................... 701/100 |

FOREIGN PATENT DOCUMENTS

EP 0 466 316 A2 1/1992
EP 0 843 089 A1 5/1998

* cited by examiner

*Primary Examiner* — Christopher P Ellis
(74) *Attorney, Agent, or Firm* — Oliff & Berridge, PLC

(57) ABSTRACT

The invention relates to an electrical control system for the nacelle of a turboreactor, comprising a plurality of electromechanical maneuvering elements for a plurality of actuating devices embodied as auxiliary parts of the turboreactor. The invention is characterized in that the control system comprises an electronic control box comprising a plurality of control inlets to be connected to control elements, and a plurality of outlets connected to electromechanical maneuvering of the auxiliary actuating devices. The control box can translate each instruction received into an operating sequence for at least one corresponding electromechanical maneuvering element. The invention also relates to a nacelle and an aircraft provided with one such control system.

11 Claims, 3 Drawing Sheets

CONTROL SYSTEM FOR THE NACELLE OF A TURBOREACTOR

The present invention relates to an electric control system designed to be fitted to a turbojet nacelle comprising a plurality of electromechanical operating members, and to a nacelle and an aircraft fitted with such a control system.

An aircraft is moved by several turbojets each housed in a nacelle also accommodating a set of auxiliary actuation devices linked to its operation and performing various functions when the turbojet is in operation or stopped. These auxiliary actuation devices comprise in particular an electro- or hydromechanical system for actuating a thrust reverser and an electro- or hydromechanical system for actuating cowls designed to allow maintenance operations on the turbojet.

The role of a thrust reverser is, during the landing of an aircraft, to improve the braking capacity of the latter by diverting forward at least a portion of the thrust generated by the turbojet. In this phase, the reverser makes it possible to send forward of the nacelle all or part of the gas flows ejected by the turbojet, thereby generating a counter-thrust that adds to the braking of the aircraft wheels. To do this, a thrust reverser comprises on either side of the nacelle a movable engine cowl that can be moved between, on the one hand, a deployed position that opens a passageway in the nacelle designed for the diverted flow during a braking phase, and, on the other hand, a retracted position which closes this passageway during normal operation of the turbojet or when the aircraft is stopped. In addition to the mechanical system for actuating the thrust reverser, a complementary mechanical system makes it possible to radially open the thrust reverser, divided for this purpose into two movable half-portions, in order to allow access to the portion of the turbojet surrounded by the reverser so that maintenance operations can be carried out.

There are therefore three main auxiliary actuation systems incorporated in a nacelle, namely the radial opening of the cowls for the maintenance of the turbojet, the deployment and retraction of the movable engine cowls of the thrust reverser, and the radial opening of the two half-portions of the thrust reverser.

Currently these actuation systems are mainly operated by hydraulic or pneumatic cylinders. These cylinders require a system for transporting a pressurized fluid obtained either by drawing air from the turbojet or by tapping into the hydraulic circuit of the aircraft. However, such systems are bulky and require considerable maintenance because the slightest leak in the hydraulic or pneumatic system can have consequences that can damage either the reverser or other portions of the nacelle. Furthermore, the hydraulic or pneumatic cylinders always deliver the maximum power available, which causes premature wear of the equipment.

To alleviate the disadvantages linked to the pneumatic and hydraulic systems, nacelle manufacturers and equipment suppliers have sought to replace them and use electric actuation systems as much as possible in order to lighten the nacelle and simplify its operation, particularly in the necessary maintenance cycles and the management of the hydraulic or pneumatic fluids. There already exist certain nacelle cowls designed for the maintenance of the turbojet that are actuated by electric cylinders, and an electrically actuated thrust reverser is described in document EP 0 843 089.

The electric actuation systems allow an optimal management of the energy according to the power that is really necessary to the operation of these systems while occupying less space in the nacelle and requiring no circuit for the circulation of pressurized fluid.

However, because of the reduced space available in the nacelle, installing and protecting them remains an important concern for the manufacturers. Currently, each electric actuation system used to perform one of the aforementioned auxiliary functions of the nacelle comprises at least one electric cylinder, actuated by an associated electric motor, and driven by appropriate control electronics that are specific thereto. It should be noted that these control electronics must be protected from the high temperatures, vibrations and other factors that might damage these circuits, which is a handicap in terms of space requirement, complexity of installation and maintenance, and cost.

The object of the present invention is to alleviate the disadvantages mentioned above and for this reason the invention consists in an electric control system designed to be fitted to a nacelle of a turbojet comprising a plurality of electromechanical operating members fitted to a plurality of auxiliary actuation devices on the turbojet, characterized in that the control system comprises an electronic control box comprising a plurality of control inputs designed to be connected to control members and a plurality of outputs connected to the electromechanical operating members of the auxiliary actuation devices, said control box being capable of converting each received command into a sequence for the operation of at least one corresponding electromechanical operating member.

It must be well understood that the electromechanical operating members providing the actuation of the movable engine cowls fitted to a thrust reverser are usually controlled by common control electronics capable of delivering thereto a considerable electric power so that they can fulfill their function. On the other hand, the electromechanical operating members moving a maintenance cowl or the radially lifting of a half-reverser are used only on the ground when the aircraft is completely stopped and require only a relatively low power relative to that required for moving the movable engine cowls of the thrust reverser during a braking phase of the aircraft.

Therefore, by providing a control system comprising a centralized electronic control box, it is possible to combine all the electronic systems currently existing to drive each electromechanical operating member without oversizing the available power capacity. Specifically, the power initially available for operating the thrust reverser in flight is sufficient also to operate the trapdoors on the ground, and there is therefore no need to provide greater power. Furthermore, such a control system makes it possible, on the one hand, to have all these driving systems in one and the same secure location, and, on the other hand, to prevent the redundancy of certain electronic functions. Accordingly, the electromechanical operating members can be made significantly lighter since it is no longer necessary to associate specific driving electronics for each electromechanical operating member and one and the same driving system placed in the electronic control box drives the electromechanical operating members performing one and the same function. Furthermore, the system for driving the electromechanical operating members is the portion most sensitive to heat and vibrations and must therefore be effectively protected. By combining the driving systems inside a common box, only this box has to be protected against high temperatures and vibrations, amongst other things, which allows an overall lightening of the whole structure and the use of electromechanical operating members that are smaller and lighter, hence also easier to install, test and maintain.

Advantageously, the electronic control box has at least one state input designed to receive position information from at least one sensor associated with at least one electromechanical operating member.

Preferably, the electronic control box has means capable of receiving and/or transmitting state information from and/or to a control system of the turbojet.

These turbojet position and operation data may advantageously be used as parameters of an operating sequence executed to actuate one or more electromechanical operating members. Furthermore, the pilot of the aircraft remains permanently informed of the state of the auxiliary actuation devices and of the progression of the operating sequences activated.

Advantageously, the electronic control box comprises at least one location designed to receive an electronic control circuit board dedicated to driving at least one auxiliary actuation device. Therefore, it is easy to replace the control electronics during an upgrade, for example, without having to replace the whole electronic control box. Preferably, the electronic control box is capable of receiving at least one dedicated electronic control circuit board for each auxiliary actuation device. In this manner, each board dedicated to the driving of a determined auxiliary device may be replaced or upgraded independently of the others.

Advantageously, the electronic control box comprises control inputs dedicated to the actuation of auxiliary maintenance actuation devices, and designed to be activated by buttons of the "dead man" type.

Again advantageously, the electronic control box comprises, on the one hand, at least one power module and, on the other hand, at least one electronic control module. Specifically, the space available for incorporating components in a nacelle is extremely limited and it may be of value to be able to divide the electronic control box into smaller modules in order to make it easier to incorporate into the nacelle.

The present invention also relates to a nacelle designed to be fitted to a turbojet and comprising at least one movable cowl designed to allow turbojet maintenance operations and at least one thrust reverser comprising at least one movable engine cowl, the maintenance cowl and the movable engine cowl each being designed so as to be actuated by at least one actuation device fitted with at least one electromechanical operating member, characterized in that it is fitted with a control system as described above, capable mainly of centralizing the control operations and the execution of sequences for operating the actuation devices specific to the maintenance cowl and to the movable engine cowl.

Advantageously, the electromechanical operating members fitted to the actuation devices designed for maintenance functions are actuated from at least one button of the "dead man" type connected to the control system.

Again advantageously, the electronic control box of the control system is attached in a front frame of the thrust reverser.

Preferably, the electronic control box is divided into at least two assemblies connected to one another. Specifically, given the reduced space available, an electronic control box subdivided into at least two assemblies may be incorporated more easily into the nacelle.

In addition, the present invention also relates to an aircraft characterized in that it is fitted with a plurality of turbojets each housed in a nacelle as described above.

The application of the invention will be better understood with the aid of the detailed description that is given below with respect to the appended drawing in which.

Before describing below an embodiment of the invention, it is important to specify that the latter is not limited to a particular nacelle structure. Although illustrated by a nacelle fitted with a grille reverser, it may be applied with nacelles of different designs, using in particular thrust reversers with doors.

Figure 1:
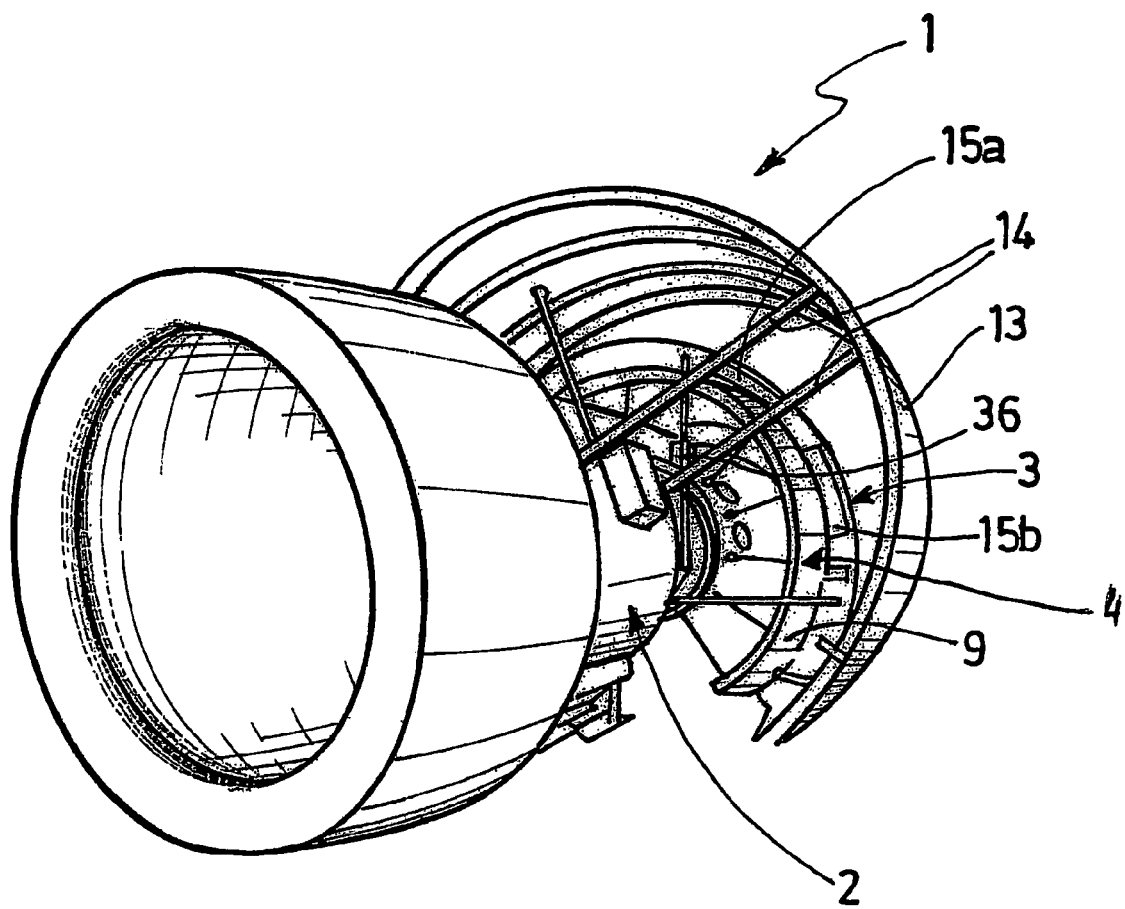
FIG. 1 is an exploded view in perspective of a nacelle fitted with a control system according to the invention.
Figure 2:
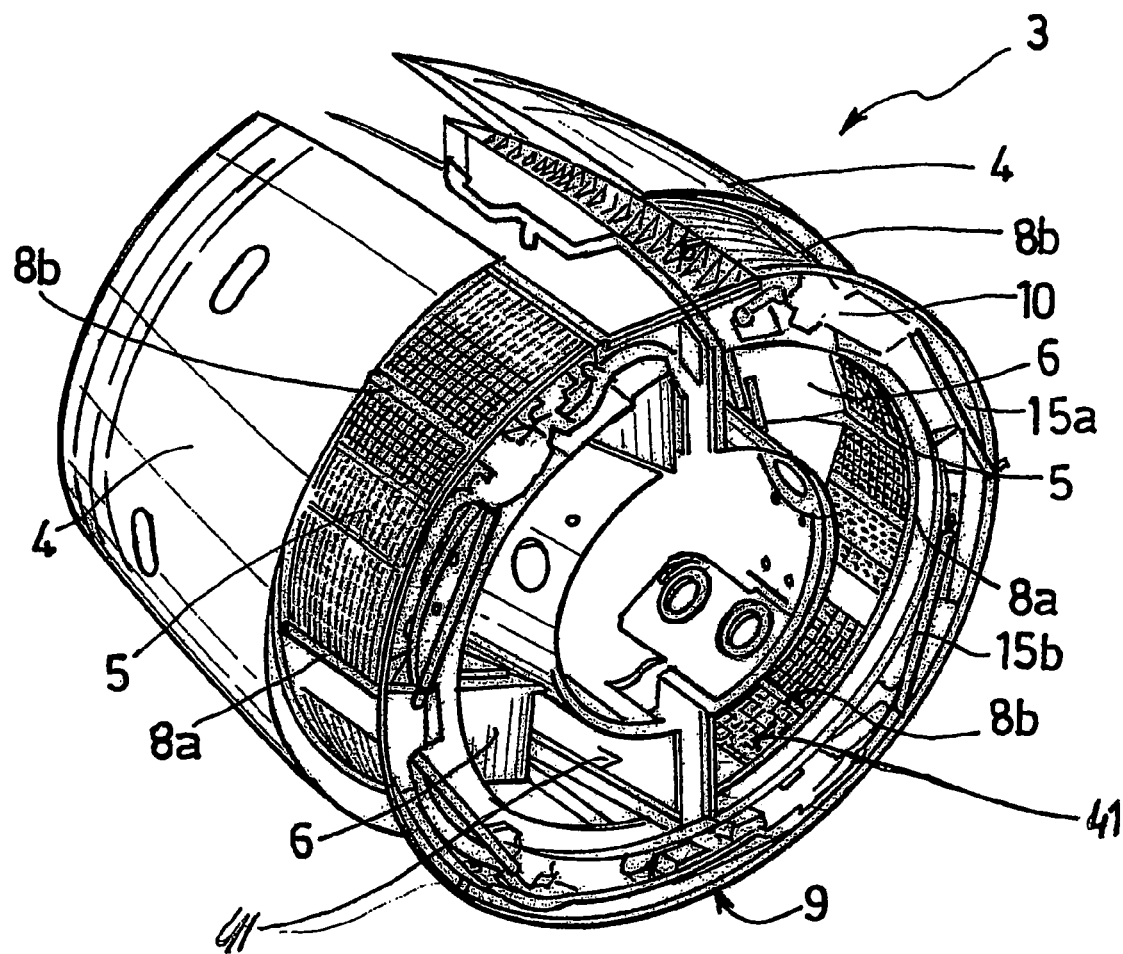
FIG. 2 is a view in perspective of a thrust reverser in the open position, called "reversed jet", fitted to the nacelle of FIG. 1.

FIG. 1 shows a partial schematic view of a nacelle 1 accommodating a turbojet 2 and incorporating a thrust reverser 3. The thrust reverser 3 has a structure placed in the rear portion of the nacelle 1 and divided into two half-portions 41 situated on either side of the nacelle 1 and each comprising a semicircular movable engine cowl 4. Each movable engine cowl 4 can be moved so as to be able to slide to reveal grilles 5 of diverter blades placed between the movable engine cowls 4 and a section for the passage of the airflow of the turbojet 2 to be diverted. Blocking doors 6 are placed inside the structure so as to be able to pivot and move from a position in which they do not hamper the passage of the airflow to a position in which they block this passage. In order to coordinate the opening of the movable engine cowls 4 with a blocking position of the blocking doors 6, the latter are each mechanically connected to one of the movable engine cowls 4 by hinges and to the fixed structure by a system of rods (not shown).

The movement of the movable engine cowls 4 are moved along the exterior of the structure by a set of cylinders 8a, 8b mounted on a front frame 9 of the thrust reverser 3 inside which are housed an electric motor 10 and flexible transmission shafts (not shown) connected respectively to the cylinders 8a, 8b in order to actuate them.

More precisely, each movable engine cowl 4 may be translated under the action of three cylinders 8a, 8b, comprising a central cylinder 8a and two additional cylinders 8b, actuated by a single electric motor 10. The power delivered by the electric motor 10 is first of all distributed to the central cylinders 8a by means of two flexible transmission shafts, then to the additional cylinders 8b by other flexible transmission shafts.

In addition, each half-portion 41 of the thrust reverser 3 can be moved and is fitted with lateral electric cylinders 12 actuated by an electric motor 35 and capable of allowing the radial opening of each half-portion 41 in order to carry out maintenance operations on the portion of the turbojet 2 surrounded by the thrust reverser 3.

Upstream of the thrust reverser 3, the nacelle 1 comprises two cowls 13 situated on either side of the nacelle 1 that can each be moved by two electric cylinders 14 actuated by an electric motor 36 so as to open the nacelle 1 and allow access to the turbojet 2 during maintenance operations.

Figure 3:
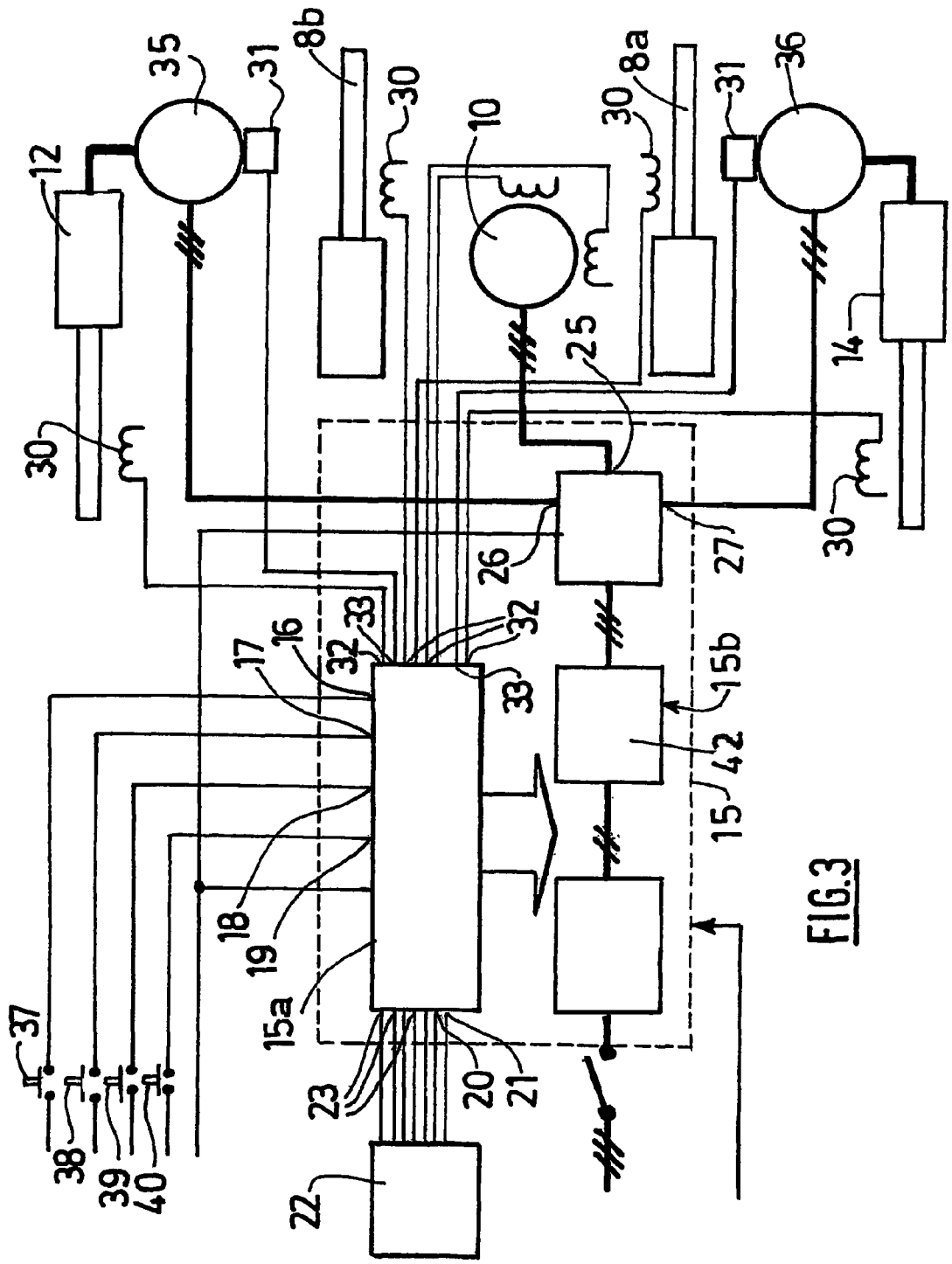
FIG. 3 is a functional diagram of a control system incorporated into the nacelle of FIG. 1.

All the electric cylinders 8a, 8b, 12, 14 are controlled by an electronic control box 15 comprising, on the one hand, an electronic module 15a designed for driving the cylinders 8a, 8b, 12, 14, and, on the other hand, a power module 15b designed to provide the electric motors 10, 35, 36 with the energy needed for their operation. This electronic control box 15 forms, with the cylinders 8a, 8b, 12, 14, a control system attached in the front frame 9 of the thrust reverser 3. Such a control system is represented schematically in FIG. 3.

The electronic module 15a of the electronic control box 15 comprises control inputs 16, 17 designed to control respectively the opening and the closing of the cowls 13, control inputs 18, 19 designed to control the radial opening and closing of the half-portions 41 of the thrust reverser 3 for maintenance operations, and control inputs 20, 21 designed to actuate the opening and closing of the movable engine cowls 4 accomplishing their thrust reversal function.

The control inputs 16, 17, 18, 19 are activated by buttons 37, 38, 40 of the "dead man" type placed on an outer face of the nacelle 1. The control inputs 20, 21 are connected to a control system 22 of the turbojet, known under the name of FADEC.

In addition, the FADEC 22 is connected to the electronic module 15a via a plurality of information inputs 23, designed to receive various operating parameters of the turbojet, such as a fan speed, a pressure value in the stream of the turbojet, and any other parameter that may be used by the electronic control box 15 to drive the cylinders 8a, 8b, 12, 14 in an appropriate manner.

These cylinders 8a, 8b, 12, 14 are each connected to an output 25, 26, 27 by which is delivered, to the electric motors 10, 35, 36 actuating the cylinders 8a, 8b, 12, 14, the electric energy necessary to make them operate in an appropriate manner according to the activated command. To do this, the electronic module 15a accommodates electronic circuit boards (not visible) that are dedicated and that each implement at least one control sequence suitable for the function for which it is designed. Therefore, the electronic module 15a houses at least one electronic circuit board designed to apply sequences for closing and opening the cowls 13, an electronic circuit board for applying sequences for radially closing and opening the half-portions 41 of the thrust reverser 3 for maintenance operations, and an electronic circuit board designed to apply sequences for closing and opening the movable thrust reversal engine cowls 4. A converter 42 makes it possible to convert the voltage of the electric power between the electric power received and the electric power necessary for the outputs 25, 26, 27 according to the motor 10, 35, 36 activated.

Furthermore, it should be noted that, on the one hand, each cylinder 8a, 8b, 12, 14 is fitted with a position sensor 30, and that, on the other hand, each electric motor 10, 35, 36 actuating the cylinders 8a, 8b, 12, 14 is fitted with a speed sensor 31 designed to measure the speed of the electric motor 10, 35, 36. Each position sensor 30, and each speed sensor 31 is connected to the electronic module 15a by state inputs 32, 33 designed to collect position and speed information and where necessary use it as parameters in a sequence for actuation of the cylinders 8a, 8b, 12, 14.

A user wishing to command the opening of the cowls 13 will proceed in the following manner. First of all, the user presses the "dead man" type button 37 assigned to the opening of the cowls 13. Doing so, he activates the corresponding control input 16 which triggers the execution of an appropriate operating sequence implemented on the electronic circuit board situated in the electronic module 15a and dedicated to the opening and closing of the cowls 13. The execution of this sequence commands and regulates the power delivered to the electric motor 36 activating the cylinders 14. Once open, the user may then do his maintenance work. Once the maintenance operation is complete, the user commands the closing of the cowls 13 by pressing the corresponding "dead man" button 38 which activates the control input 17. In the same manner, he thereby triggers the execution of the operating sequence that corresponds to closing and that is implemented on the electronic circuit board dedicated to the cowls 13.

The use of the "dead man" type buttons 37, 38 is particularly recommended for reasons of safety. Specifically, these buttons require the constant pressure of the operator in order for the sequence for opening or closing the cowls 13 to be executed. If the operator releases the button 37, 38 before the end of the opening or closing sequence, the sequence is stopped.

It should also be noted that the actuation of the cowls 13 can occur only on the ground when the turbojet 2 is stopped. Before activating the appropriate operating sequence, it is possible to verify the operation of the turbojet 2 thanks to the information inputs 23 originating from the FADEC 22 and if appropriate, to prevent the execution of a sequence for opening or closing the cowls.

In the same manner, a user wishing to command the radial opening of the half-portions 41 of the thrust reverser 3 to carry out a maintenance operation on the portion of the turbojet 2 surrounded by said thrust reverser 3 will proceed in the following manner. First of all, the user presses the "dead man" type button 39 assigned to the radial opening of the half-portions 41. Doing so, he activates the corresponding control input 18 which triggers the execution of an appropriate operating sequence implemented on the electronic circuit board dedicated to the radial opening and closing of the half-portions 41 and which is situated in the electronic module 15a. The execution of this sequence commands and regulates the power delivered to the electric motor 35 activating the cylinders 12. Once the maintenance operation is complete, the user commands the closing of the half-portions 41 of the thrust reverser 3 by pressing the corresponding "dead man" button 40 that activates the control input 19. In the same manner, he thereby triggers the execution of the operating sequence corresponding to the closing of the half-portions 41 that is implemented on the dedicated electronic circuit board.

As above, the radial actuation of the half-portions 41 must occur only when the turbojet 2 is stopped. Before activating the appropriate operating sequence, the operation of the turbojet 2 is tested thanks to a specific information input and, where appropriate, the execution of a sequence for opening or closing the half-portions 41 is prevented. It should be noted that usually it is also necessary to open the movable engine cowls 4 before being able to radially raise the half-portions 41.

The movable engine cowls 4 are actuated by the cylinders 8a, 8b. This movement is commanded by the pilot of the aircraft from the flight deck. The latter actuates the corresponding commands on the control panel, commands that are retransmitted to the FADEC 22 then to the electronic module 15a by the control inputs 20 or 21, depending on whether the pilot commands respectively an opening or a closing of the movable engine cowls 4.

The activation of the control input 20, 21 triggers the execution of an appropriate operating sequence on the electronic circuit board placed in the electronic module 15a and dedicated to the actuation of the movable thrust reversal engine cowls 4. The collection of operating information from the turbojet 2 via the information inputs 23 makes it possible to adapt the operating sequence according to the various parameters of the turbojet 2 such as, for example, its operating speed.

It should be noted that the cowls 13 and the half-portions 41 of the thrust reverser 3 are actuated only on the ground when the turbojet is stopped. The maximum total electric power necessary is that necessary for actuating the cylinders 8a, 8b, 12, 14 subjected to the most intense forces, that is to, say the cylinders 8a, 8b actuating the movable engine cowls 4 during a thrust reversal. Consequently, the power supply module 15b will be sized to be able to deliver a maximum electric power sufficient to actuate the movable engine cowls 4 in thrust reversal mode, this power being sufficient to open the cowls 13 and the half-portions 41 during a maintenance operation when the aircraft is stopped. Consequently, it is not necessary to oversize the power module 15b relative to an existing power module.

Although the invention has been described with reference to particular exemplary embodiments, it is evident that it is in no way limited and that it includes all the technical equivalents of the means described and their combinations if the latter are included in the context of the invention. It should in particular be noted that the present invention is not limited to the devices performing the thrust reversal and maintenance functions performed by the electromechanical operating members but may also relate to any other function that is commanded electrically and incorporated into a turbojet nacelle.

The invention claimed is:

1. An electric control system designed to be fitted to a nacelle of a turbojet comprising a plurality of electromechanical operating members fitted to a plurality of auxiliary actuation devices on the turbojet, wherein the control system comprises an electronic control box comprising a plurality of control inputs connected to control members and a plurality of outputs connected to the electromechanical operating members of the auxiliary actuation devices, said control box being capable of converting each received command into a sequence for the operation of at least one corresponding electromechanical operating member.

2. The control system as claimed in claim 1, wherein the electronic control box has at least one state input designed to receive position information from at least one sensor associated with at least one electromechanical operating member.

3. The control system as claimed in claim 1, wherein the electronic control box has means capable of receiving and/or transmitting state information from and/or to a control system of the turbojet.

4. The control system as claimed in claim 1, wherein the electronic control box comprises at least one location designed to receive an electronic control circuit board dedicated to driving at least one auxiliary actuation device.

5. The control system as claimed in claim 1, wherein the electronic control box further comprises auxiliary maintenance actuation device control inputs dedicated to actuating auxiliary maintenance actuation devices, and designed to be activated by dead man control button.

6. The control system as claimed in claim 1, wherein the electronic control box comprises at least one power module and at least one electronic control module.

7. A nacelle designed to be fitted to a turbojet and comprising at least one movable cowl designed to allow turbojet maintenance operations and at least one thrust reverser comprising at least one movable engine cowl, the maintenance cowl and the movable engine cowl each being designed so as to be actuated by at least one actuation device fitted with at least one electromechanical operating member, wherein it is fitted with a control system as claimed in claim 1 mainly capable of centralizing the control operations and the execution of sequences for operating the actuation devices specific to the maintenance cowl and to the movable engine cowl.

8. The nacelle as claimed in claim 7, wherein the electromechanical operating members fitted to the actuation devices designed for maintenance functions are actuated from at least one dead man control button connected to the control system.

9. The nacelle as claimed in claim 7, wherein the electronic control box of the control system is attached in a front frame of the thrust reverser.

10. The nacelle as claimed in claim 7, wherein the electronic control box is divided into at least two assemblies connected to one another.

11. An aircraft wherein it is fitted with a plurality of turbojets each housed in a nacelle as claimed in claim 7.

* * * * *